United States Patent
Khoshnevis

(10) Patent No.: US 8,029,710 B2
(45) Date of Patent: Oct. 4, 2011

(54) GANTRY ROBOTICS SYSTEM AND RELATED MATERIAL TRANSPORT FOR CONTOUR CRAFTING

(75) Inventor: Behrokh Khoshnevis, Marina del Rey, CA (US)

(73) Assignee: University of Southern California, Los Angeles, CA (US)

( * ) Notice: Subject to any disclaimer, the term of this patent is extended or adjusted under 35 U.S.C. 154(b) by 838 days.

(21) Appl. No.: 11/934,507

(22) Filed: Nov. 2, 2007

(65) Prior Publication Data

US 2010/0025349 A1 Feb. 4, 2010

Related U.S. Application Data

(60) Provisional application No. 60/864,293, filed on Nov. 3, 2006.

(51) Int. Cl.
 *B28B 19/00* (2006.01)
(52) U.S. Cl. ......... 264/34; 14/74.5; 105/163.1; 212/312
(58) Field of Classification Search ............... 14/74.5; 105/163.1; 212/312; 264/34
 See application file for complete search history.

(56) References Cited

U.S. PATENT DOCUMENTS

| | | | |
|---|---|---|---|
| 634,026 A * | 10/1899 | Pittman | .............................. 14/6 |
| 984,517 A | 2/1911 | Rollinger | |
| 1,578,511 A | 3/1926 | Gladwin | |
| 2,556,503 A * | 6/1951 | Nelson | .......................... 104/307 |
| 3,221,456 A | 12/1965 | Vevoda | |
| 3,562,991 A | 2/1971 | Kustusch | |
| 3,611,519 A * | 10/1971 | Larrson | .............................. 425/3 |
| 3,826,196 A | 7/1974 | Wallace | |
| 3,863,771 A | 2/1975 | Dobbie et al. | |
| 3,909,863 A * | 10/1975 | Macrander et al. | ............ 14/74.5 |
| 3,957,137 A | 5/1976 | Vermette | |
| 3,966,533 A | 6/1976 | Goldsworthy | |
| 4,066,723 A | 1/1978 | King et al. | |
| 4,067,446 A | 1/1978 | Ray | |
| 4,464,803 A * | 8/1984 | Bonasso | ........................... 14/20 |
| 4,475,976 A * | 10/1984 | Mittelstadt et al. | ........... 156/286 |

(Continued)

FOREIGN PATENT DOCUMENTS

DE 10211754 A1 10/2003

(Continued)

OTHER PUBLICATIONS

EP Application No. 07844870.1. 2009. Extended European Search Report, dated Dec. 23, 2009, 7 pages.

(Continued)

*Primary Examiner* — Thomas J. Brahan
(74) *Attorney, Agent, or Firm* — McDermott Will & Emery LLP

(57) ABSTRACT

Apparatus and methods are disclosed that are useful for robotic gantry systems that are lightweight while at the same time offering rigidity or stiffness for implementation in Contour Crafting construction and material delivery techniques. The present disclosure is directed to robotic gantry system and material transport apparatus that use of very light structural members that have sufficient compressive strength, but which may otherwise be weak in the presence of bending forces, in conjunction with cables that provide stiffness against bending. Use of such cables provides needed tension while at the same time allowing the robotic gantry system to be very light compared to solid structures, e.g., those with I-beams, etc. Material delivery systems including passive articulated arms are also disclosed.

17 Claims, 14 Drawing Sheets

U.S. PATENT DOCUMENTS

| | | | |
|---|---|---|---|
| 4,637,738 A * | 1/1987 | Barkley | 384/38 |
| 4,658,485 A * | 4/1987 | Yang | 29/26 A |
| 4,747,745 A | 5/1988 | Pippen et al. | |
| 4,781,067 A * | 11/1988 | Cichanski | 73/620 |
| 4,833,855 A | 5/1989 | Winter, IV | |
| 4,850,382 A | 7/1989 | Williams | |
| 5,040,431 A * | 8/1991 | Sakino et al. | 74/490.09 |
| 5,059,266 A | 10/1991 | Yamane et al. | |
| 5,260,009 A * | 11/1993 | Penn | 264/401 |
| 5,529,471 A | 6/1996 | Khoshnevis | |
| 5,617,515 A | 4/1997 | MacLaren | |
| 5,656,230 A | 8/1997 | Khoshnevis | |
| 5,664,382 A | 9/1997 | Melnick et al. | |
| 5,749,196 A | 5/1998 | Bangma | |
| 5,848,458 A | 12/1998 | Bullen | |
| 5,920,974 A * | 7/1999 | Bullen | 29/33 K |
| 5,934,199 A * | 8/1999 | Koeppl | 105/163.1 |
| 6,001,181 A | 12/1999 | Bullen | |
| 6,103,161 A | 8/2000 | Lopez | |
| 6,170,220 B1 | 1/2001 | Moore, Jr. | |
| 6,246,203 B1 | 6/2001 | Abbott et al. | |
| 6,363,683 B1 | 4/2002 | Moore, Jr. | |
| 6,423,261 B1 | 7/2002 | Joseph et al. | |
| 6,662,516 B2 | 12/2003 | Vandehey et al. | |
| 6,976,599 B1 | 12/2005 | Rivera et al. | |
| 6,989,887 B2 * | 1/2006 | Poon et al. | 355/72 |
| 7,001,464 B1 | 2/2006 | Erdman et al. | |
| 7,153,454 B2 | 12/2006 | Khoshnevis | |
| 7,641,461 B2 | 1/2010 | Khoshnevis | |
| 2003/0004599 A1 | 1/2003 | Herbak | |
| 2003/0164200 A1 | 9/2003 | Czeranna et al. | |
| 2005/0196482 A1 | 9/2005 | Khoshnevis | |
| 2005/0196484 A1 | 9/2005 | Khoshnevis | |

FOREIGN PATENT DOCUMENTS

| | | |
|---|---|---|
| DE | 102004047525 A1 | 4/2006 |
| GB | 781465 A | 8/1957 |
| WO | WO 03/086717 | 10/2003 |

OTHER PUBLICATIONS

International Search Report PCT/US07/83637. International filing date Nov. 5, 2007. Date of mailing May 15, 2008.

EP Application No. 10015728.8 (Divisional of EP Application No. 07844870.1), entitled Gantry Robotics System and Related Material Transport for Contour Crafting. Extended European Search Report, mailed Aug. 28, 2011, 5 pages.

* cited by examiner

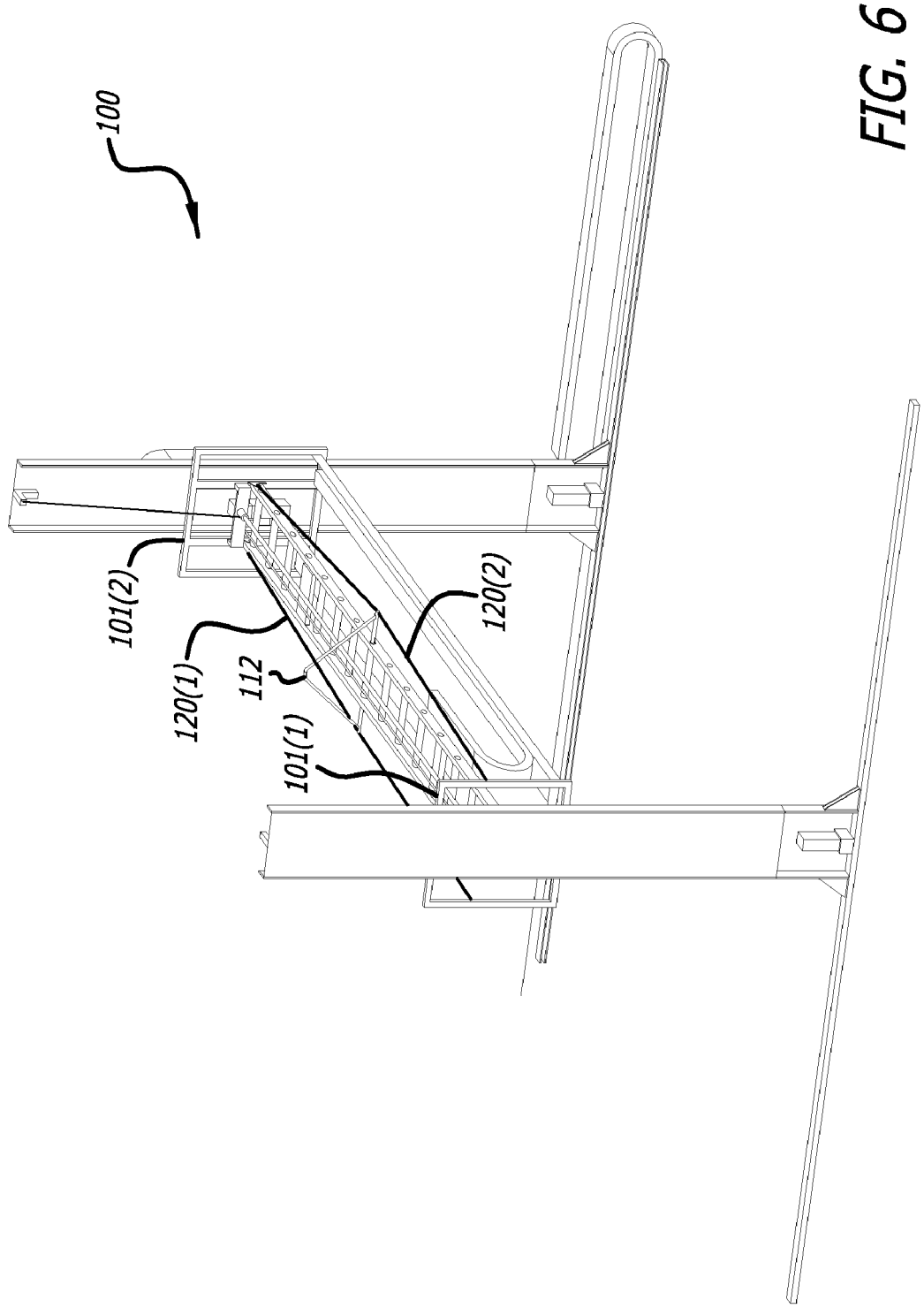

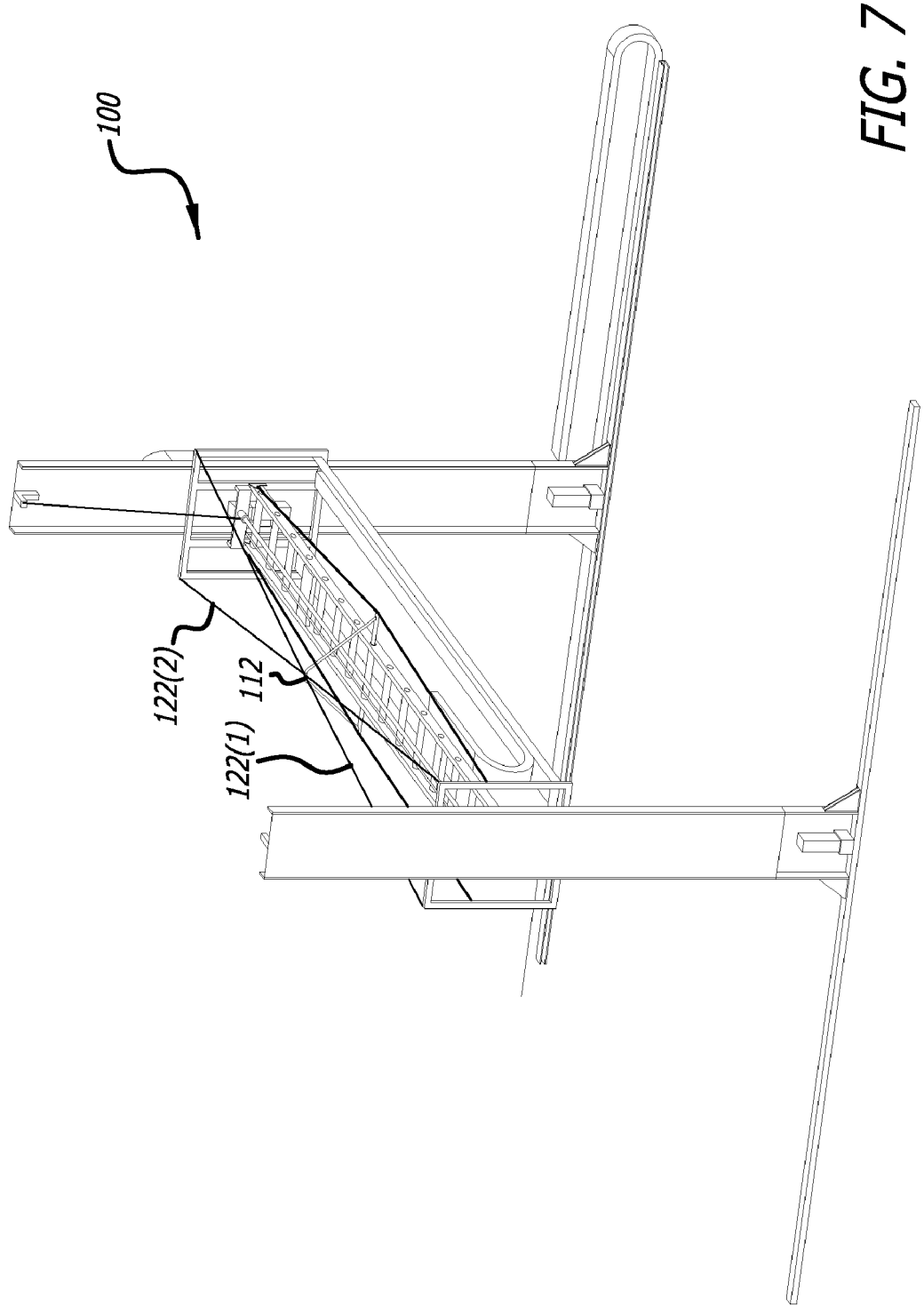

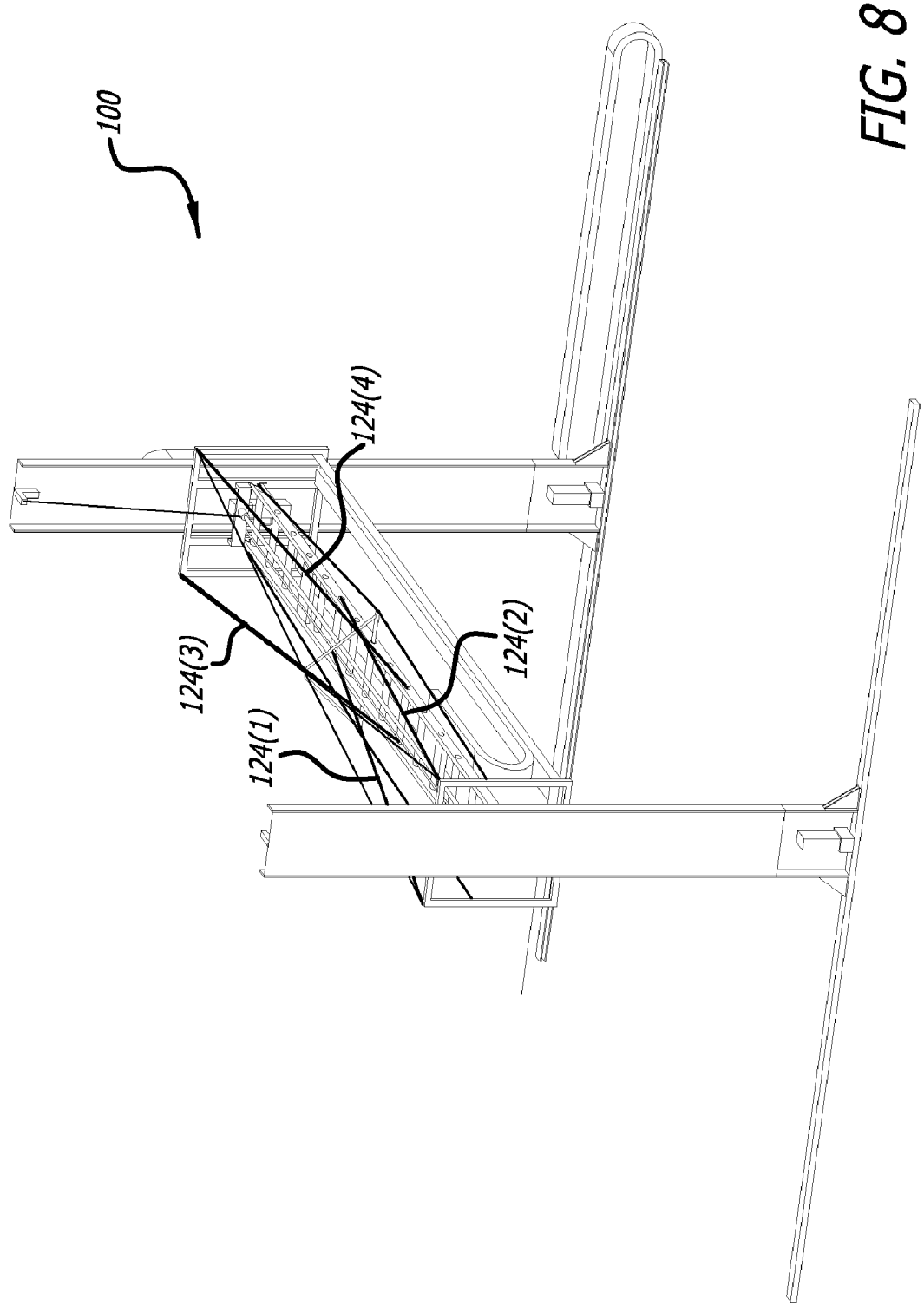

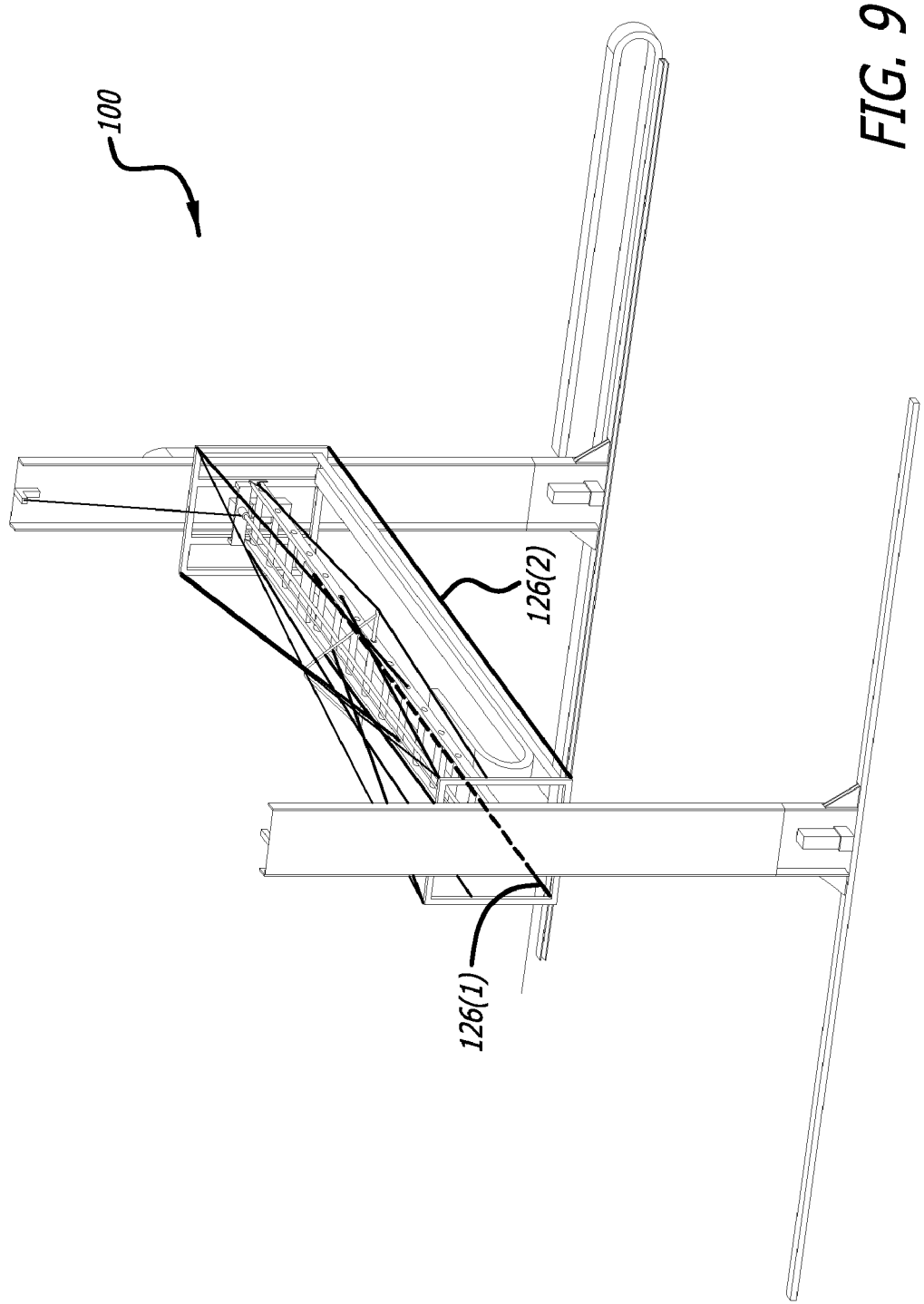

GANTRY ROBOTICS SYSTEM AND RELATED MATERIAL TRANSPORT FOR CONTOUR CRAFTING

CROSS-REFERENCE TO RELATED APPLICATION

This application claims priority to U.S. Provisional Patent Application Ser. No. 60/864,293, entitled "Gantry Robotics System and Related Material Transport for Contour Crafting," filed Nov. 3, 2006, the contents of which are incorporated herein by reference in their entirety.

GOVERNMENT INTEREST

This invention was made with government support under Grant No. N000140510850, awarded by the Office of Naval Research. The government has certain rights in the invention.

BACKGROUND

Constructing homes, offices, boats and other structures has an ancient heritage. Despite all of the centuries of development, however, there can be difficulties and problems.

Construction is usually very labor intensive. Even a modest size structure usually requires the efforts of numerous individuals. This can be very costly. Simultaneously using the time of numerous individuals in an efficient manner can also be challenging.

The results of the construction effort can also be inconsistent. The appearance and quality of one structure can vary from another built from the same design. This can be caused by differences in the skills, efforts, supervision and techniques employed by those that work on the structures.

Construction may also result in wasted material. For example, when wood is used, standard, off-the-shelf lengths must often be cut to meet design requirements, resulting in waste. Construction using manual labor can also be very time-consuming, requiring months and, in some instances, years to complete. Construction can also be hazardous. Many construction workers are killed or seriously injured at construction sites, including about 500,000 in the United States alone.

Robotic systems have been used for Contour Crafting construction techniques, e.g., those in which curable cementitious fluids are applied in contours for a building layout/structure.

One robotic approach has used a gantry structure. Because of cost, speed of motion, ease of transport and erection at site, safety and energy conservation it is important for the gantry to be as light as possible. Design of light weight large gantries has been seen as a challenge for applications that require accuracy. Moreover, large size results in flexing of structural members the increase in stiffness of which usually results in added weight, given a material (aluminum, steel, composites, etc.) for the members. Also, material delivery to the nozzle of such gantry systems, which move in a large volume in the 3D space, have proven to be difficult to implement. Furthermore, delivery of the material to the nozzle given the localized motions of the nozzle (rotation and deflections) can also present significant challenges.

What is needed, therefore, are robotic systems that are lightweight while at the same time offering pronounced rigidity or stiffness for implementation in Contour Crafting construction and material delivery techniques.

SUMMARY

The present disclosure addresses the shortcomings noted for the prior art by presenting techniques, e.g., apparatus and methods, useful for robotic gantry systems that are lightweight while at the same time offering pronounced rigidity or stiffness for moving a fluid delivery nozzle in desired motions within a given volume, such as for implementation in Contour Crafting construction and material delivery techniques.

The present disclosure is directed to robotic gantry system and material transport apparatus that use of very light structural members that have sufficient compressive strength, but which may otherwise be weak in the presence of bending forces, in conjunction with cables that provide stiffness against bending. Use of such cables provides needed tension while at the same time allowing the robotic gantry system to be very light compared to solid structures, e.g., those with I-beams, etc.

Various techniques useful in conjunction with the subject matter of the present application are described in: U.S. Provisional Patent Application Ser. No. 60/733,451, entitled "Material Delivery Approaches for Contour Crafting," filed Nov. 4, 2005; and U.S. Provisional Patent Application Ser. No. 60/820,046, entitled "Accumulated Design for Cementitious Material Delivery," filed Jul. 21, 2006. The entire content of both of these applications is incorporated herein by reference.

Additional useful techniques are described in: U.S. patent application Ser. No. 11/566,027, entitled "Material Delivery System Using Decoupling Accumulator," Behrokh Khoshnevis, Inventor; filed Nov. 2, 2006; U.S. patent application Ser. No. 11/556,048, entitled "Dry Material Transport and Extrusion," filed Nov. 2, 2006; and U.S. Provisional Application Ser. No. 60/864,060, entitled "Metering and Pumping Devices," filed Nov. 2, 2006. The entire content of all of these applications is incorporated herein by reference.

Additional useful techniques are described in: U.S. patent application Ser. No. 10/760,963, entitled "Multi-Nozzle Assembly for Extrusion of Wall," filed Jan. 20, 2004, which claims priority to and incorporates by reference U.S. Provisional Application Ser. No. 60/441,572, entitled "Automated Construction," filed Jan. 21, 2003. This application is also related to U.S. patent application Ser. No. 11/040,401, entitled "Robotic Systems for Automated Construction," filed Jan. 21, 2005, U.S. patent application Ser. No. 11/040,602, entitled "Automated Plumbing, Wiring, and Reinforcement," filed Jan. 21, 2005, and U.S. patent application Ser. No. 11/040,518, entitled "Mixer-Extruder Assembly," filed Jan. 21, 2005, all three of which claim priority to U.S. Provisional Application Ser. No. 60/537,756, entitled "Automated Construction Using Extrusion," filed Jan. 20, 2004. This application is also related to the following U.S. Provisional Applications: Ser. No. 60/730,560, entitled "Contour Crafting Nozzle and Features for Fabrication of Hollow Structures," filed Oct. 26, 2005; Ser. No. 60/730,418, entitled "Deployable Contour Crafting Machine," filed Oct. 26, 2006; Ser. No. 60/744,483, entitled "Compliant, Low Profile, Non-Protruding and Genderless Docking System for Robotic Modules," filed Apr. 7, 2006; and Ser. No. 60/807,867, entitled "Lifting and Emptying System for Bagged Materials," filed Jul. 20, 2006. This application is also related to U.S. patent application Ser. No. 11/552,741, entitled "Deployable Contour Crafting," filed Oct. 25, 2006, and U.S. patent application Ser. No. 11/552,885, entitled "Extruded Wall with Rib-Like Interior," filed Oct. 25, 2006. The entire content of all of these applications is incorporated herein by reference.

Other features and advantages of the present disclosure will be understood upon reading and understanding the detailed description of exemplary embodiments, described herein, in conjunction with reference to the drawings.

BRIEF DESCRIPTION OF THE DRAWINGS

Aspects of the disclosure may be more fully understood from the following description when read together with the accompanying drawings, which are to be regarded as illustrative in nature, and not as limiting. In the drawings, like elements are indicated by the same reference character(s). The drawings are not necessarily to scale, emphasis instead placed on the principles of the disclosure. In the drawings:

FIG. 6 depicts a perspective view of the robotic gantry system of FIG. 1 with only two cables providing resistance against bending in the X direction shown;

FIG. 7 depicts a perspective view of the robotic gantry system of FIG. 1 with cables providing resistance against rotation of the gantry bridge due to the inertia of the metering devices and nozzle assembly that is mounted under the bridge, in addition to those cables shown in FIG. 6;

FIG. 8 depicts a perspective view of the robotic gantry system of FIG. 1 with cables that prevent the bridge from bending in the vertical direction, in addition to those cables shown in FIGS. 6-7;

FIG. 9 depicts cables that compensate for all the tensile forces of the cables in FIGS. 6-8 above the bridge, in addition to those cables shown in FIG. 6-8;

Figure 1:
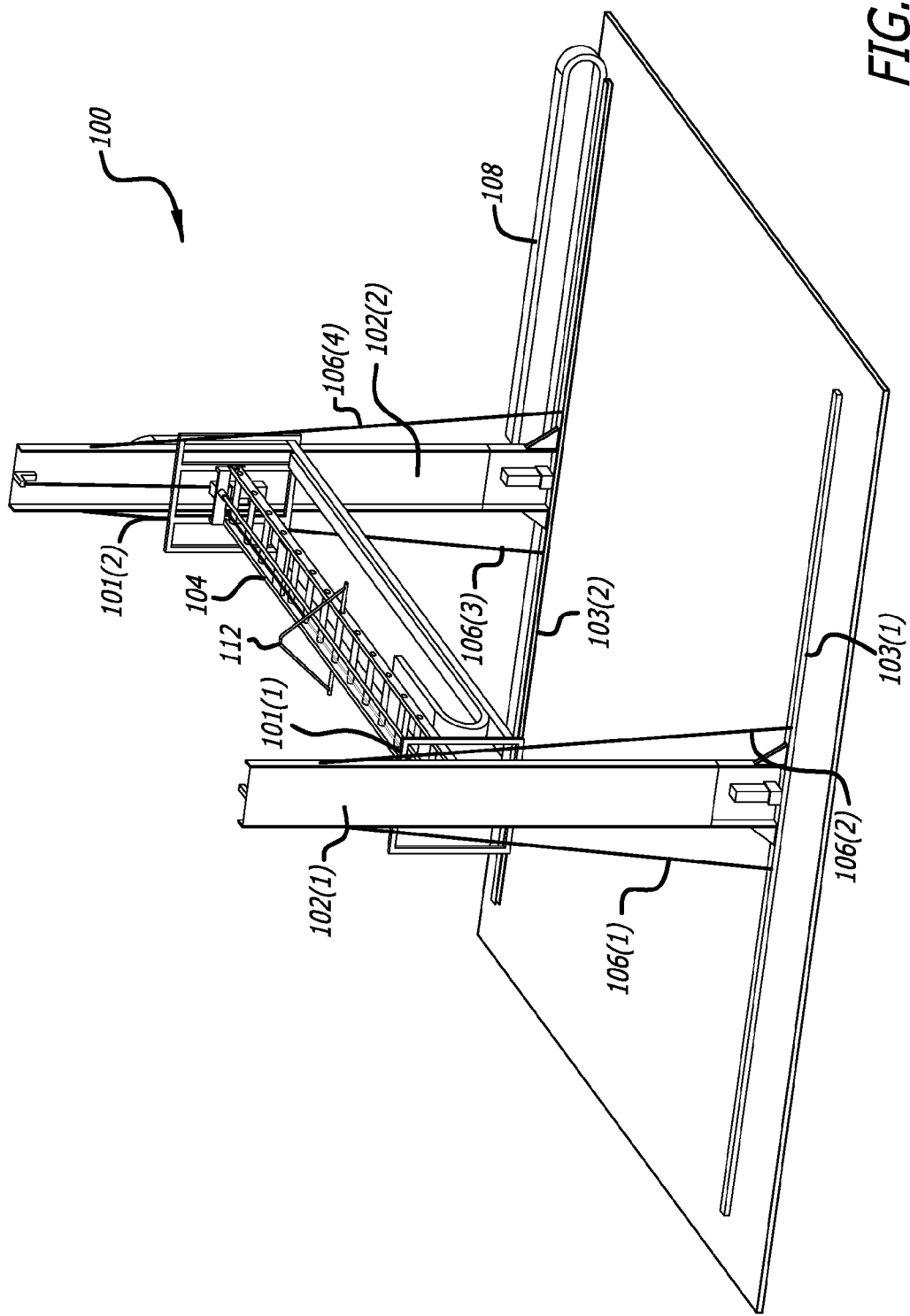
FIG. 1 depicts a perspective view of an embodiment of a robotic gantry system, according to an embodiment of the present disclosure.

While certain embodiments are depicted in the drawings, one skilled in the art will appreciate that the embodiments depicted are illustrative and that variations of those shown, as well as other embodiments described herein, may be envisioned and practiced within the scope of the present disclosure.

DETAILED DESCRIPTION

The present disclosure is directed to robotic gantry system and material transport apparatus that use very light structural members that have sufficient compressive strength, but which may otherwise be weak in the presence of bending forces, in conjunction with cables that provide stiffness against bending. Use of such cables provides needed tension while at the same time allowing the robotic gantry system to be very light compared to solid structures, e.g., those with I-beams, etc.

The Gantry

Motion Elements, Energy Sources and Mechanical Motion Transfer Mechanisms

FIG. 1 depicts a perspective view of an embodiment of a robotic gantry system 100, according to an embodiment of the present disclosure. The gantry system 100 shown in FIG. 1 has three major structural members: two columns 102(1)-102(2) that each ride on a rail 103(1)-103(2), and a bridge 104 that connects the columns 102(1)-102(2). The bridge 104 by its design is relatively lightweight for the stiffness it affords, as described in further detail as follows. The gantry system is configured and arranged for moving a fluid delivery assembly (e.g., nozzle) in three-dimensional space (volume) defined by an X axis in the direction of the rails 103(1)-103(2), a Y in the direction of the bridge 104, and a Z axis in the vertical direction.

As shown in FIG. 1, the two columns 102(1)-102(2) are each supported by two cables 106(1)-(4) that restrict the possible deflection of the columns in the X axis upon highly accelerated/decelerated motion or rapid change of direction along this axis. Two square structures 101(1) and 101(2) are on each end of the bridge. The triangular structure 112 in the middle of the bridge transfers the cable tensile forces to the bridge thereby adding significantly to its stability.

The gantry system 100 has three degrees of freedom: in direction of X, along the rails 103(1)-103(2); in direction of Y, along the bridge 104; and, in direction of Z, along the two vertical columns 102(1)-102(2). By providing such three-dimensional movement under the control of an appropriate motion controller, the gantry system can place a fluid delivery nozzle (not shown) at a desired location in a volume of space for constructing a structure. In exemplary embodiments, Contour Crafting techniques and/or nozzles as described in U.S. Pat. No. 7,153,454, noted previously and incorporated herein by reference, may be used.

A special feature of gantry system 100 is that it does not explicitly have a Z axis. The movement in the vertical direction is achieved by the elevation and lowering of the entire bridge 104. This arrangement has several advantages, most notably it has the added stiffness that would be difficult to achieve using prior art designs, e.g., a commonly used vertical mast that rides on the bridge, moving the nozzle along its length.

As described previously, it is often difficult to maintain stiffness for such a mast structure. Also, if the space along he height is limited (such as a factory for building prefab houses or components) then the mast would need to be telescopic in structure which would add significantly to the machine complexity, cost, and inaccuracy that could only be remedied by expensive linear bearings and excessive motion transfer components.

Figure 2:
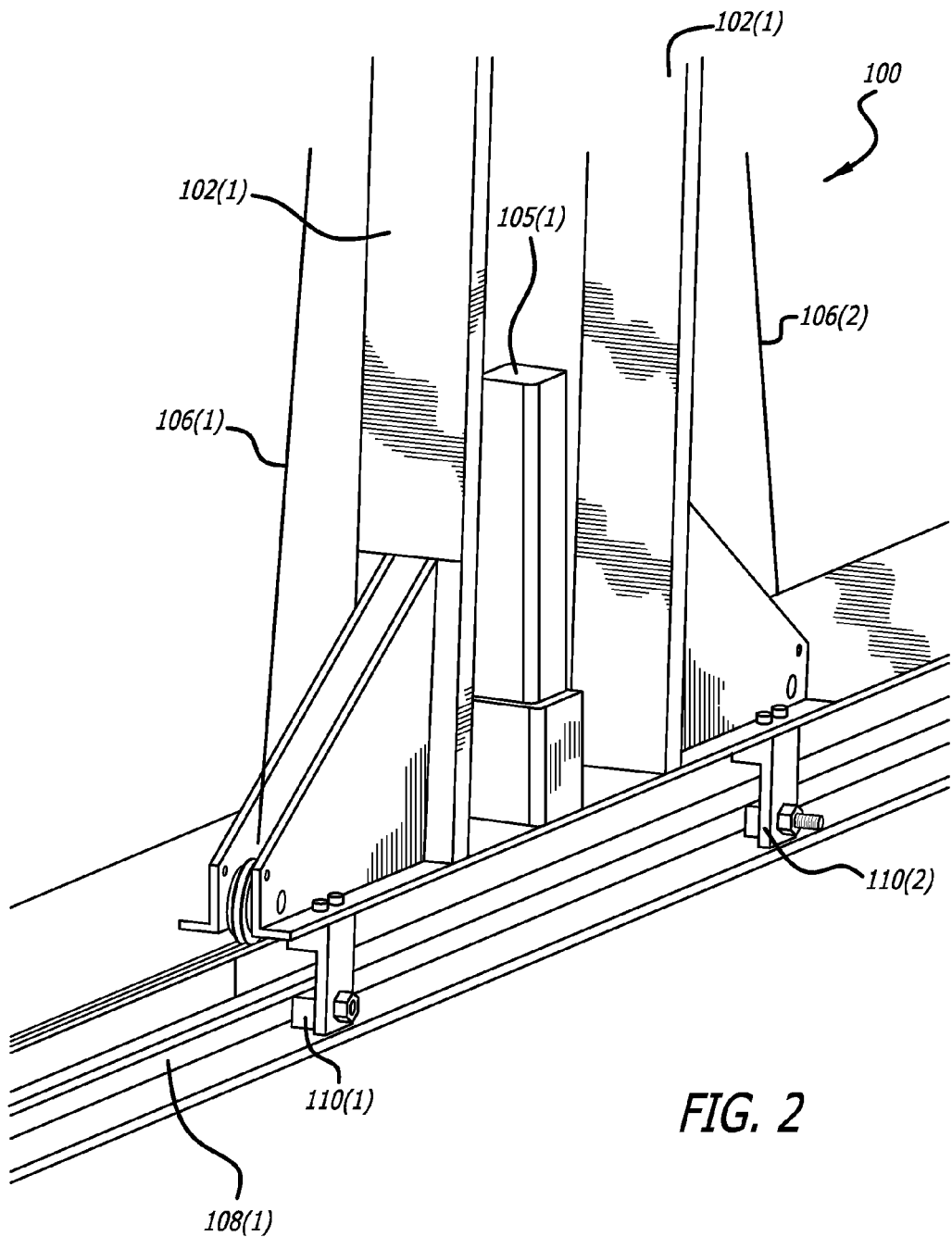
FIG. 2 depicts a close-up perspective view of the sliding connection between a column and rail of FIG. 1.

As shown in FIG. 2, the movement in the X direction can be provided by two servo motors, such as motor 105(1) in FIG. 2, each exerting linear force through a suitable arrangement, e.g., a rack and pinion arrangement. Each motor is vertically mounted at the base of each vertical column 102(1)-102(2), which ride on either groove or linear bearings or other sliding mechanisms. Two bearings 110(1)-110(2) that run inside the U channel 108(1) under the rail, e.g., 103(1) prevent the columns 102(1)-102(2) from being lifted, which could otherwise happen when sudden change of direction or start and stop take pace.

The two motors can be synchronized through a master-slave protocol implemented by a main controller. In such an arrangement, the slave motor can be moved each time by the magnitude generated as feed back by the encoder signal of the master motor. To prevent out-of-sync situation during power shut down, the X motors can be equipped with electro-mechanical brakes (not shown) that can be automatically activated when power is disconnected. Hence the X motors can be prevented from accidentally being moved out of their parked location by an external force.

Figure 3:
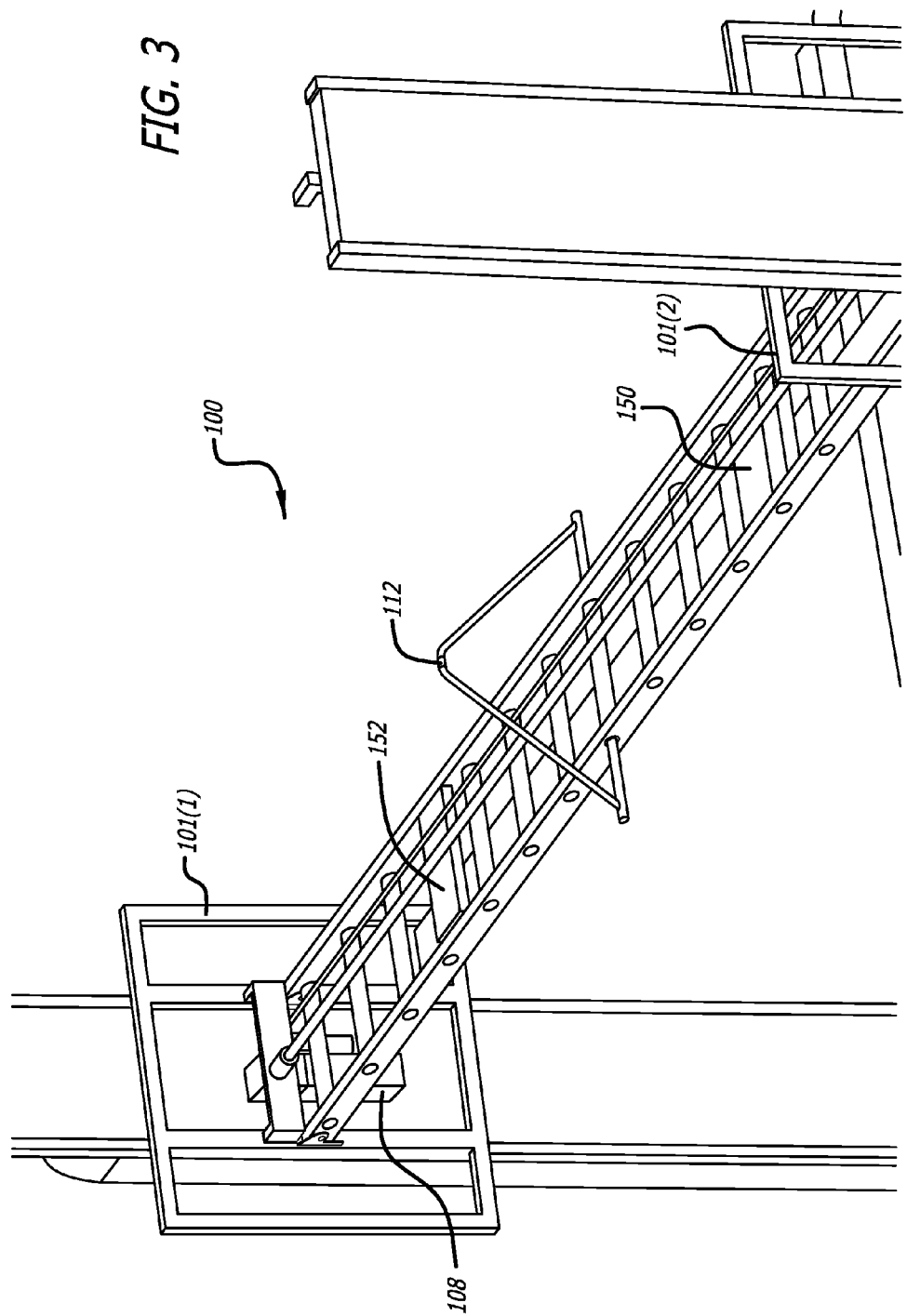
FIG. 3 depicts a close-up perspective of the bridge of FIG. 1.

Referring now to FIG. 3, movement along the Y direction is made possible by means of a timing belt mechanism that is driven by a third servo motor (108 in FIG. 3 behind the square structure 101(1)). For compactness purpose the motor 108 can utilize a right-angle (90 degree shaft conversion) gearhead. Note that the belt drives the cart 150 that holds the nozzle assembly (not shown) under the bridge 104.

To neutralize or mitigate the effects of the momentum of the mass of the cart assembly 112, a counter-mass 152 can be attached to the upper part of the timing belt. The counter-mass 152 can ride on top of the bridge 104 and always moves in the opposite direction of the cart assembly 150. This arrangement prevents side forces that could deflect the entire structure in the direction of the Y axis upon sudden motions or change of directions. Using this arrangement the columns 102(1)-102(2) do not need to be stiffened in the Y direction. This reduces the overall width of the machine 100.

Figure 4:
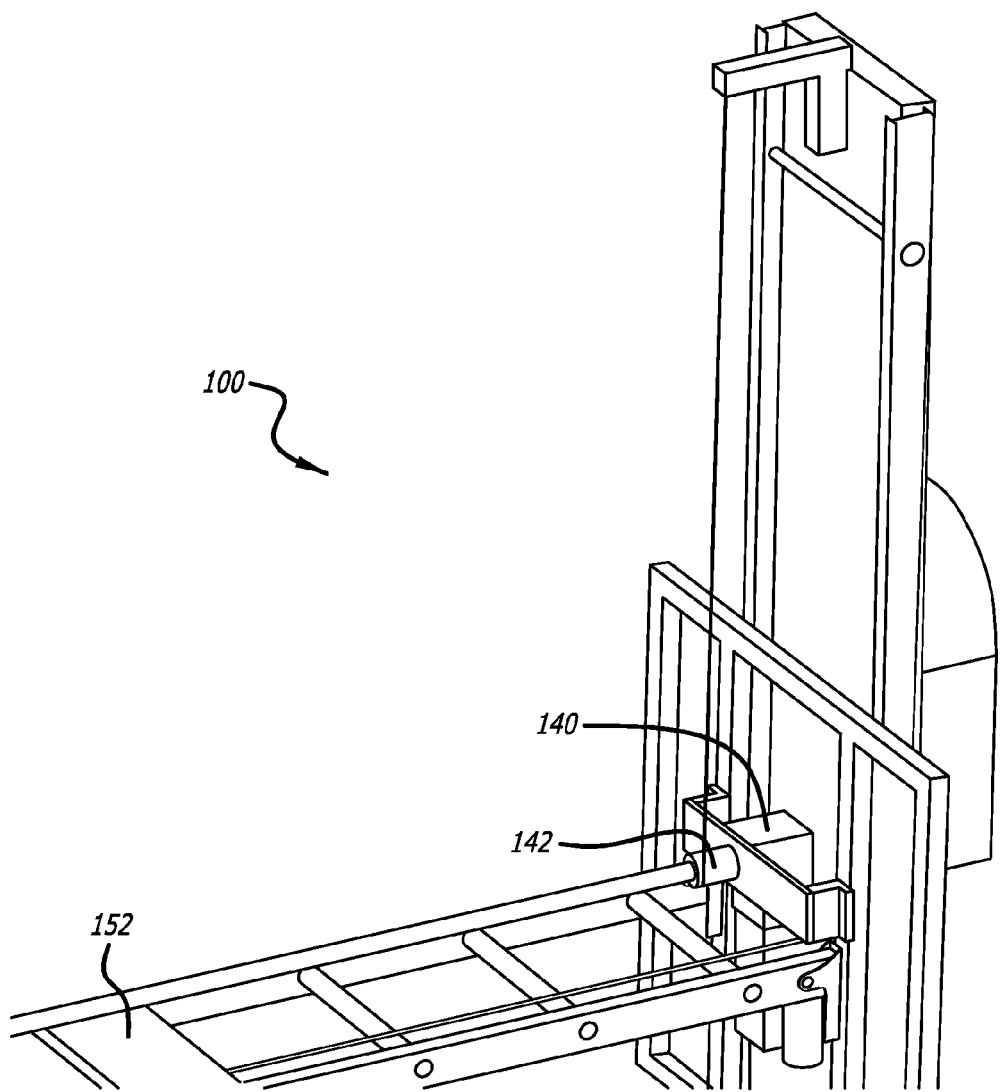
FIG. 4 depicts a close-up perspective of the connection between the bridge and one of the columns of FIG. 1.

Movement along Z direction is provided by the motor 140 shown in FIG. 4. This motor 140, which may also be equipped with a right-angle gearhead, can drive two cable spools (shown as 142 in FIGS. 4 and 5).

Figure 5A:
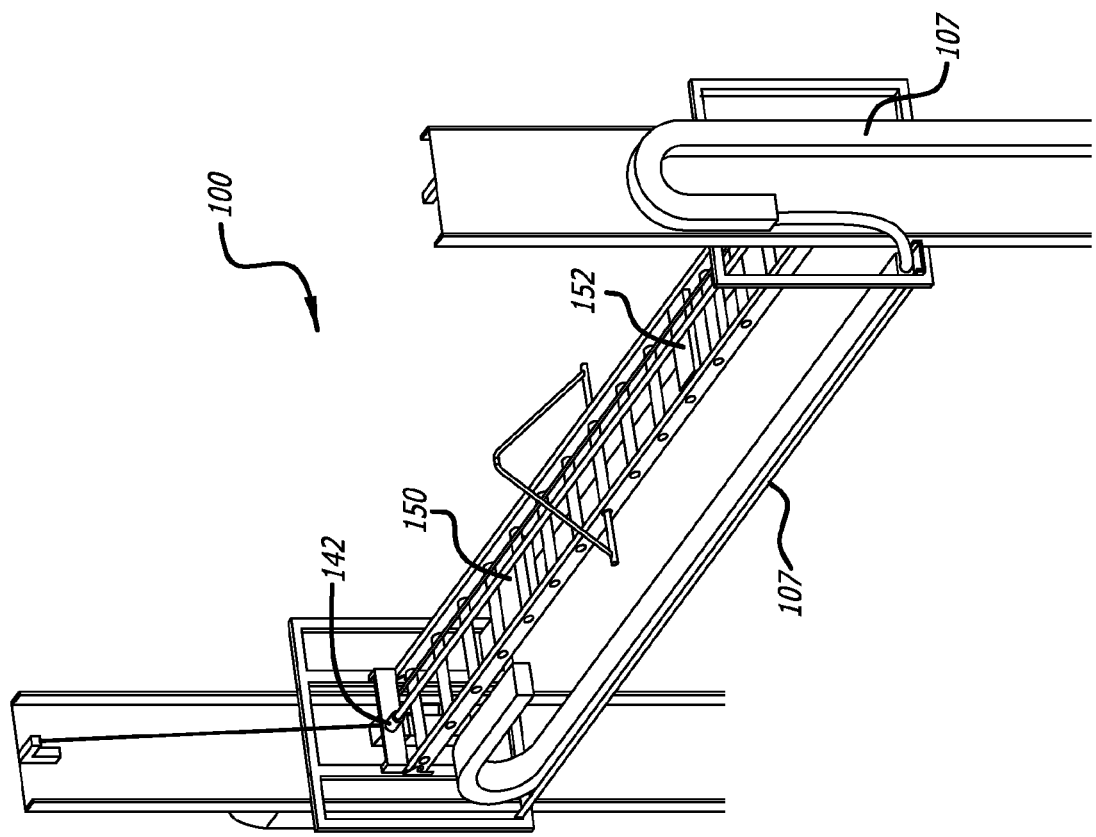
FIG. 5A depicts another perspective view of the bridge and columns of FIG. 1.

FIG. 5A depicts another perspective view of the bridge and columns of FIG. 1. The two spools 142 can be connected by way of a long rod, therefore turning one spool would simultaneously turn the other. The spools wind and pull on cables that are secured to the top of each vertical column. This action results in elevation of the bridge assembly. Reverse rotation of the spools lowers the assembly.

To prevent the possibility of a sudden fall of the bridge at the time of power shut down or failure, the driving motor may be equipped with an electro-mechanical brake which activates when electricity is cut off from the motor. An alternative approach would be the use of a worm gear for the Z motor. So-called worm gears cannot be back-driven, hence in the event of power loss the gear inherently prevents the movement of the bridge assembly.

In exemplary embodiments, two rack and pinion sets can be used instead of the cable approach shown in FIG. 5A, one on each vertical Z axis column. For such embodiments, both pinions may be driven by the same shaft driven by a single servo motor. Alternatively, the pinion of each set may be driven by a servo motor. The two servo motors would be synchronized in the like manner as in the X axis explained earlier (i.e., a master/slave configuration).

Easing the Alignment Problem

Figure 5B:
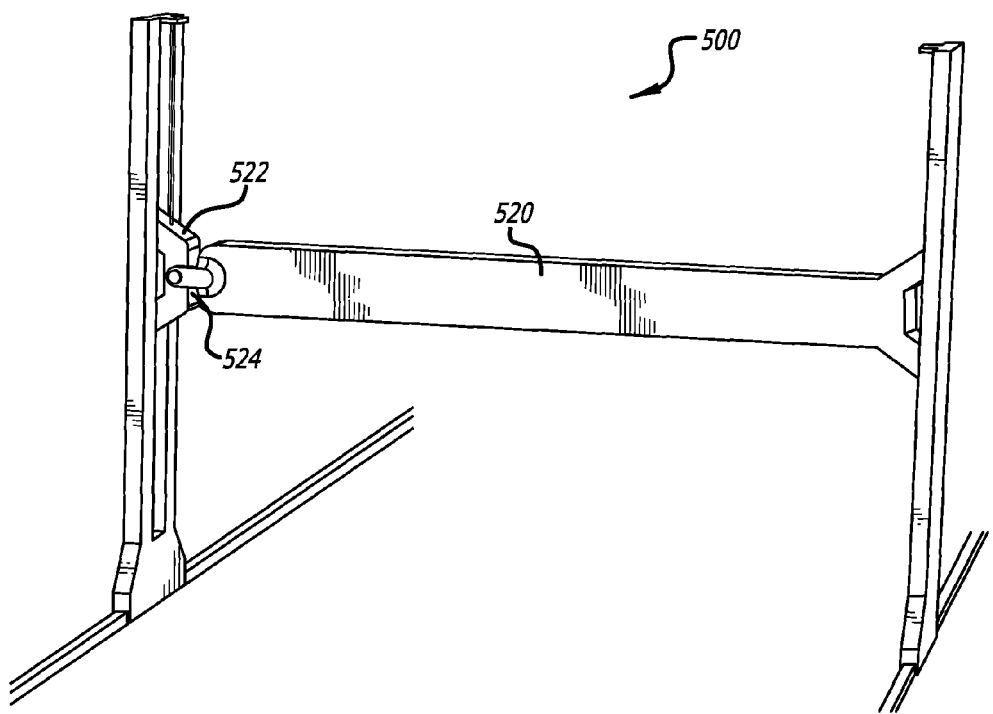
FIG. 5B depicts an alternate embodiment of the connection between a bridge and columns, in accordance with a further embodiment of the present disclosure.
Figure 5C:
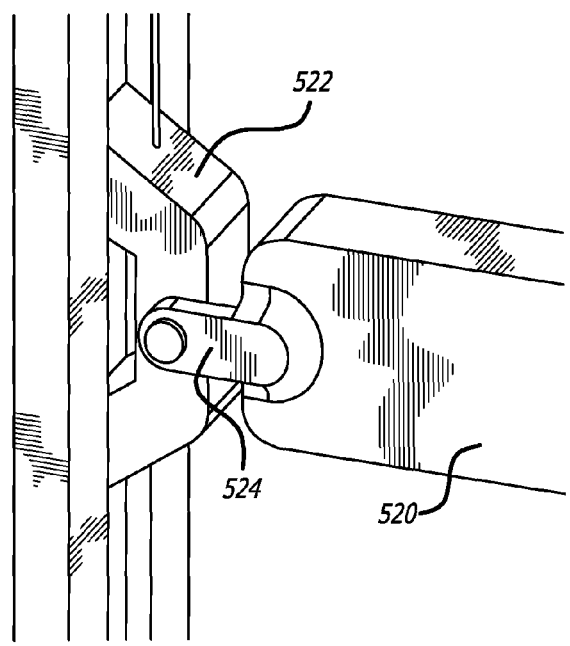
FIG. 5C illustrates a close-up of the hinge portion of FIG. 5A.

FIG. 5B shows an alternate embodiment 500 for connecting the bridge to the columns. As can be appreciated, one difficulty with making gantry system of FIG. 1 deployable for use on construction sites is the alignment problem. If the distance between the rails is not equal to the length of the Y bridge then the misalignment could impede and jam the up and down movement of the Y bridge. To allow for errors in misalignment of the rails, one end of the Y bridge 520 may be connected by means of a hinge 524 to its corresponding vertical slide mechanism 522, as shown in FIG. 5B. Given that the other end of the Y bridge is connected to the corresponding column by bearing mechanisms at least in two points with some vertical distance; and given that both ends of the Y bridge are suspended by cables (not shown), or are engaged with the columns through rack and pinions, the entire structure will still have no degree of freedom and will hence rigidly stand unless moved by motors. Under this arrangement in case of rail misalignment, up and down motion of Y bridge would force the angle of the columns with respect to the horizon to deviate slightly from 90 degrees, but no jamming would occur. This of course would create some error in the geometry of the fabricated structure, however, slight errors are not crucial in most building construction applications for which the gantry is intended.

The sequence of FIGS. 6 through 9 demonstrates the functions of each set of cables used in the particular embodiment 100 shown in FIG. 1. For the purpose of clarification each set of cable is described incrementally.

FIG. 6 depicts a perspective view of the robotic gantry system of FIG. 1 with only two cables 120(1)-120(2) providing resistance against bending in the X direction shown. The set of cables shown in FIG. 6 provide stiffness in the direction of the X axis. Any deflection of the main horizontal member (the gantry bridge) would necessitate the stretching of the cables shown. Resistance of the cables 120(1)-120(2) would therefore add significantly to the stiffness of the gantry bridge. Stiffness of the gantry bridge is crucial especially during acceleration and decelerations in the X axis direction (such as at the beginning and ending of walls).

FIG. 7 depicts a perspective view of the robotic gantry system of FIG. 1 with cables providing resistance against rotation of the gantry bridge due to the inertia of the metering devices and nozzle assembly that is mounted under the bridge, in addition to those cables shown in FIG. 6.

The cable arrangement shown in FIG. 7, including cables 122(1)-122(2), is used to provide stiffness against rotation of the gantry bridge 104 due to the inertia of the metering devices and nozzle assembly that is mounted under the bridge. The imbalance of the mass on top and bottom of the bridge would result in forces that tend to rotate the bridge upon acceleration and deceleration along the X axis. The triangular structure 112 in the middle of the bridge transfers the cable tensile forces to the bridge thereby adding significantly to its stability.

FIG. 8 depicts a perspective view of the robotic gantry system of FIG. 1 with cables that prevent the bridge from bending in the vertical direction, in addition to those cables shown in FIGS. 6-7.

The cable arrangement shown in FIG. 8, including cables 124(1)-124(4), serve to prevent the bridge from bending in the vertical direction. Note that the cables facing each other from opposite directions along the length of the bridge overlap over a segment of the bridge. If this overlap does not exist the bridge could still bend along the segment between the two ends of the cable that are connected to the middle region of the bridge.

FIG. 9 depicts cables that compensate for all the tensile forces of the cables in FIGS. 6-8 above the bridge, in addition to those cables shown in FIG. 6-8.

In FIG. 9, cables 126(1)-126(2) compensate for all the tensile forces of the aforementioned cables (shown in FIGS. 6-8) above the bridge 102. There are two such cables 126(1)-126(2), one on each side of the bridge.

Note that in this arrangement the only compressive force is supplied by the bridge structural member. The rest of the forces are all tensile and provided by the various cables. The tension in each of the cables is accurately adjustable. A systematic procedure must be followed when tightening the cables so that true alignment is achieved. The main indicator of alignment is the perpendicularity of the square frames to the bridge.

Material Transport

As pointed out earlier, the gantry system provides only three directions of motion to the fluid delivery nozzle. Rotation motion is preferable, however, for the fluid delivery nozzle to build various geometrical features (such as corners, curves, etc.). Given that cementitious materials used by fluid delivery often require fairly rigid and thick hoses that are hard to wind around the nozzle upon rotation, a mechanism is preferably used that will not need excessive rotation forces and can operate in a relatively small volume.

Figure 10A:
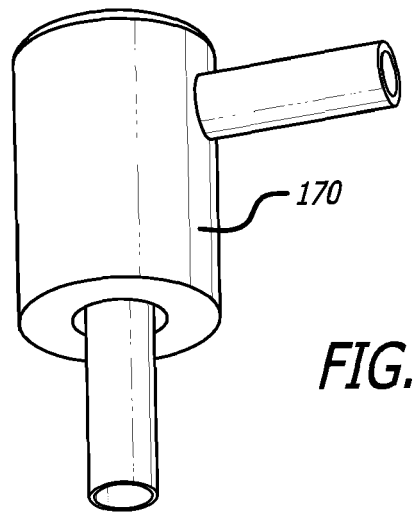
FIGS. 10A-10B depict, respectively, perspective views of a nozzle assembly used with a rotary union and metering devices, in accordance with a further embodiment of the present disclosure.
Figure 10B:
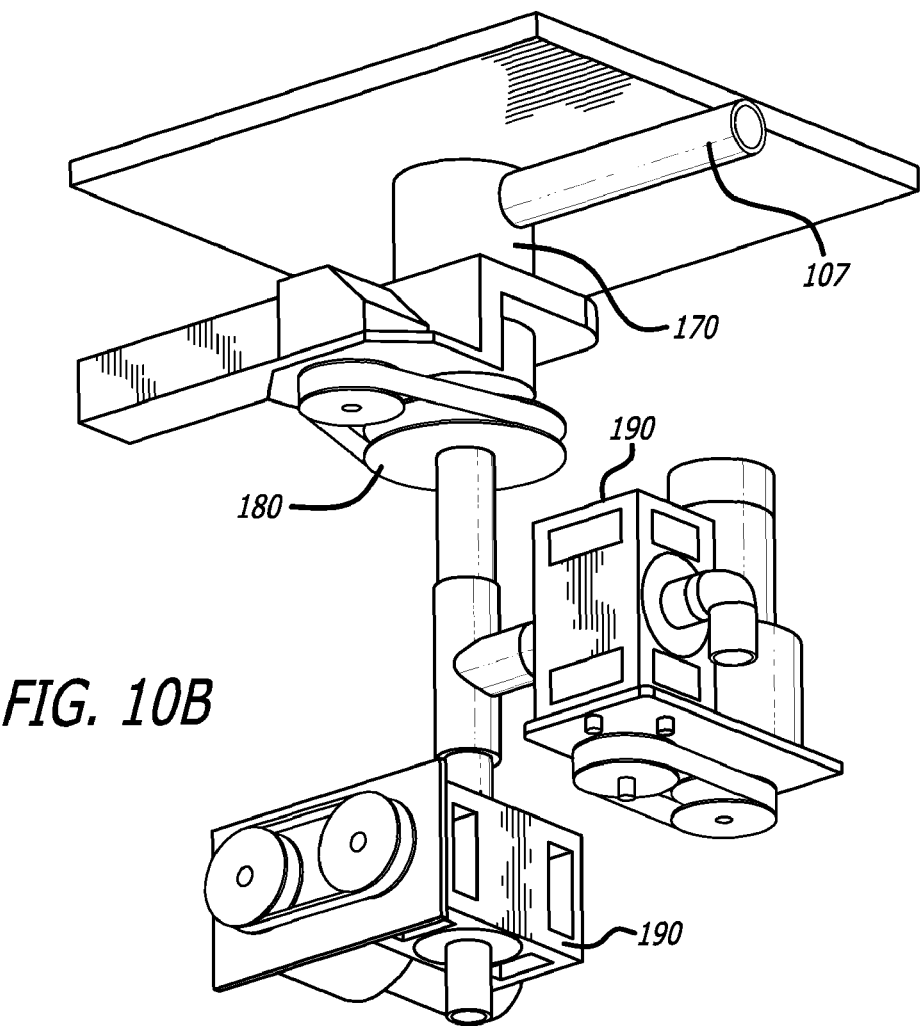

FIGS. 10A-10B depict, respectively, perspective views of a nozzle assembly used with a rotary union and metering devices, in accordance with a further embodiment of the present disclosure.

In exemplary embodiments according to the present disclosure, a rotary union 170, such as shown in FIGS. 10A-10B, may be used for such a purpose. A rotary union can receive a fluid in its inlet and direct it through a pipe that can be rotated by an indefinite number of degrees. In certain exemplary embodiments, a Deublin Rotary Union, made available by Deublin Company, 2050 Norman Drive West, Waukegan, IL 60085, USA.

Figure 11:
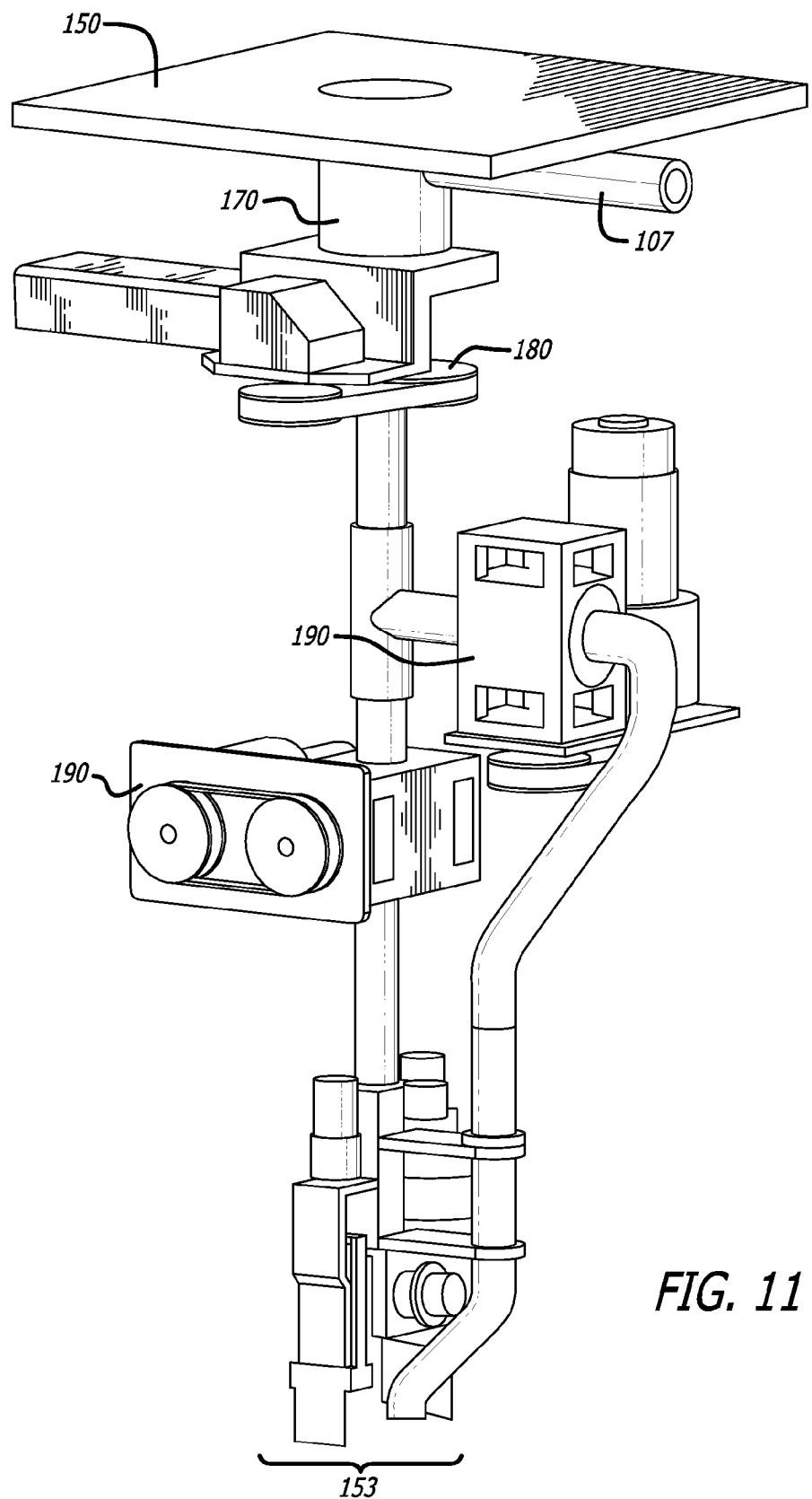
FIG. 11 depicts a perspective view of a nozzle assembly with metering devices, rotary union and fluid delivery hose.

FIGS. 10A, FIG. 10B, and FIG. 11 show how a rotary union 170 may be attached to the gantry cart/platform and its output pipe rotated by a servo motor 180. The output pipe of the rotary union may be attached to metering devices 190 that feed into the fluid delivery nozzle (nozzle 153 in FIG. 11).

In the embodiments shown, two metering devices 190 are used, one for the outside orifices of the fluid delivery nozzle and another for its internal orifice. In other embodiments, a different number of metering devices (including just one) may be used; moreover, any suitable metering device may be used.

Exemplary embodiments can utilize metering and pumping devices 190 as described in U.S. patent application Ser. No. 11/933,985 (now U.S. Pat. No. 7,574,925), entitled "Metering and Pumping Devices," filed Nov. 2, 2007, which claims priority to U.S. Provisional Application Ser. No. 60/864,060, entitled "Metering and Pumping Devices," filed Nov. 2, 2006 and U.S. Provisional Application Ser. No. 60/864,291, entitled "Metering and Pumping Devices," filed Nov. 3, 2006; the entire contents of all of which applications are incorporated herein by reference in their entirety.

As was previously described concerning FIG. 1, the material hose 107 may be directed through the same cable tracks that connect the motors and sensors (such as end of limit switches). A single material hose 107 may be connected to the inlet of the rotary union_170 mounted on the nozzle assembly cart/platform 150. The single flow may then be divided into two, each entering a metering device the outlets of which are connected to the inlets of the fluid delivery nozzle.

Figure 12:
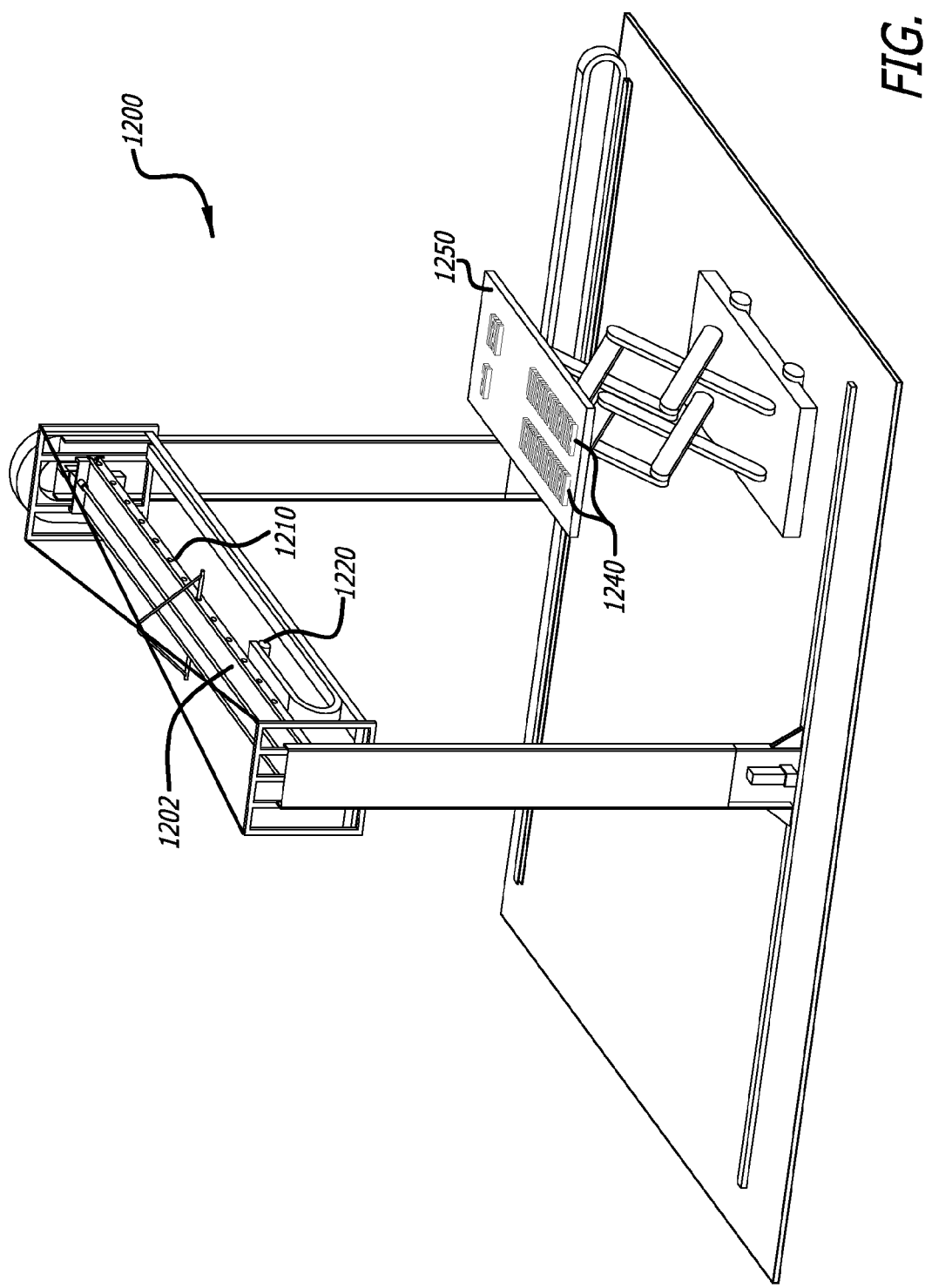
FIG. 12 depicts a gantry system, similar to that of FIG. 1, with a robotic manipulator and separate moveable tray useful for installing building components to a structure being built.

FIG. 12 depicts a gantry system 1200, similar to system 100 of FIG. 1, with a robotic manipulator and separate moveable tray useful for installing building components to a structure being built.

As shown in FIG. 12, a robotic manipulator 1210 may be installed on a gantry bridge 1202 that could move on the bridge 1202 jointly with or independently of a nozzle assembly 1220. The manipulator 1210 may be used for placing reinforcement, plumbing, electrical or other modules 1240 inside the structure as it is constructed. In exemplary embodiments, a tray 1250 may be used as a source of the modules and may be placed at one end of the gantry work envelope, as shown. Such a tray 1250 may be elevated by its own independent motorized system each time the gantry bridge 1202 is elevated such that the tray 1250 always stays at an elevation that would make the modules 1240 accessible to the robotic manipulator 1210.

Figure 13A:
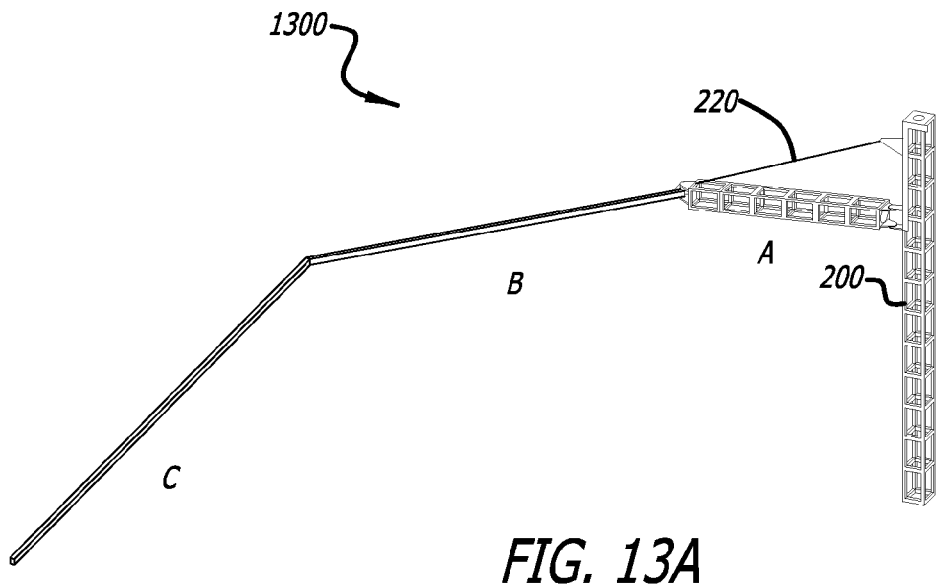
FIGS. 13A-13C depict an alternative embodiment for routing a material transport hose through cable tracks by way of a passive articulated arm.
Figure 13C:
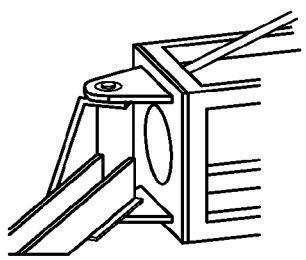
Figure 13B:
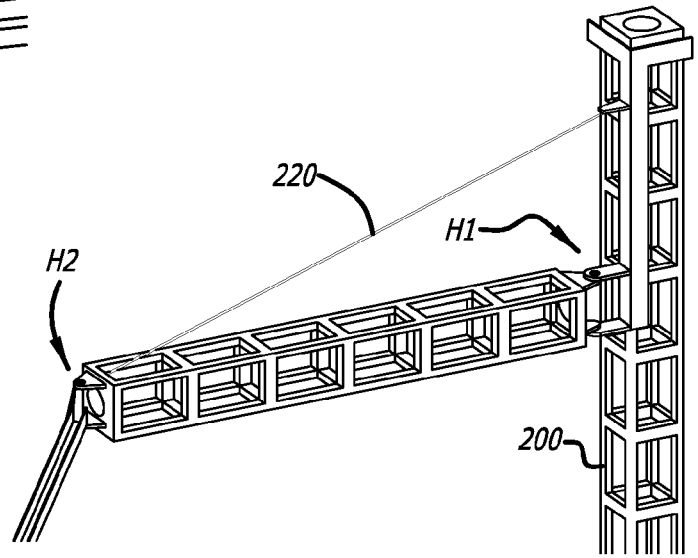

FIGS. 13A-13C depict an alternative embodiment 1300 for routing the material hose 107 (not shown) through cable tracks is an independent routing approach by means of a passive articulated arm. The advantage of this method/embodiment is reduction in the hose length and the possibility of using larger diameter hoses, which would be problematic to route through cable carriers (because of large diameter and large radius of bend).

The articulated arm A-C could be mounted on an adjacent wall or on its own independent vertical truss 200 which could be installed at a corner of the work envelope of the robot (e.g., the North-East corner). The arm may have a desired number of segments, e.g., three segments (A+B+C), that are hinged together. These segments can collectively direct the hose from the material source to the nozzle on the robotic gantry system, e.g., system 100 of FIG. 1.

Segment A is hinged at H1 to the vertical truss 200 and can swing in a horizontal plane. This segment can be made of a truss to resist bending as well as torsion forces exerted by Segment B. To assist the structure in resisting bending forces a cable 220 may be used. In the embodiment shown, attached to the end of segment A is segment B which also swings in the horizontal plane only around the hinge shown as H2. Finally, the end of segment B is attached by means of a universal joint (which allows swinging sideways as well as up and down) to segment C.

For the embodiment of FIGS. 13A-13C, the articulated arm moves passively by the force of the robot, however, the major portion of the weight of the material hose is carried by segments A and B of the arm. The only weight exerted on the robot (e.g., system 100 of FIG. 1) is a portion of the weight of segment C and a portion of the weight of the hose segment that is placed on segment C. Note that for the sake of clarity the material hose is not drawn in the FIGS. 13A-13C.

While certain embodiments have been described herein, it will be understood by one skilled in the art that the methods, systems, and apparatus of the present disclosure may be embodied in other specific forms without departing from the spirit thereof.

Accordingly, the embodiments described herein, and as claimed in the attached claims, are to be considered in all respects as illustrative of the present disclosure and not restrictive.

What is claimed is:

1. A robotic gantry system comprising:

first and second columns each slidably riding a substantially horizontal rail;

a bridge slidably having a substantially horizontal longitudinal axis connected to the first and second columns so as to permit sliding of the bridge vertically with respect to the columns;

a cable support extending upwardly from each end of the bridge;

an anchor structure affixed to and extending upwardly from approximately the center of the bridge;

at least one cable connected between each cable support structure at a location on each cable support that is above an end of the bridge and to the anchor structure at a location above the approximate center of the bridge, the cable being configured to cooperate with the anchor structure to substantially prevent twisting of the bridge along the substantially horizontal longitudinal axis of the bridge; and a nozzle assembly slidably connected to the bridge and configured to extrude cementitious material.

2. The robotic gantry system of claim 1 further comprising a nozzle assembly slidably connected to the bridge and configured to extrude cementitious material.

3. The robotic system of claim 1, wherein the nozzle assembly comprises a nozzle connected to a nozzle platform.

4. The robotic gantry system of claim 3, further comprising a counter weight coupled to the nozzle platform.

5. The robotic gantry system of claim 1, including two cables providing resistance against bending of the bridge in a horizontal direction perpendicular to the length of the bridge;

6. The robotic gantry system of claim 1, including two or more cables that prevent the bridge from bending in a vertical direction.

7. The robotic gantry system of claim 1, including a plurality of cables configured and arranged to compensate for tensile forces.

8. The robotic gantry system of claim 1 wherein the at least one cable includes two cables attached to each cable support structure at two locations on the cable support structure that are horizontally spaced-apart from one another.

9. The robotic gantry system of claim 8 wherein the two cables cross at the approximate location at which they attach to the anchor structure.

10. The robotic gantry system of claim 9 wherein the two cables are each attached to the cable support structure at a location above an end of the bridge.

11. The robotic gantry system of claim 9 wherein the two cables are oriented so as to form an "X" when looking downward on the cables from above the cables.

12. The robotic gantry system of claim 1 comprising:
a nozzle assembly slidably connected to the bridge and configured to extrude cementitious material; and
a counter-mass configured to move horizontally on the bridge always in the opposite direction of the nozzle assembly so as to minimize generation of side forces upon movement of the nozzle assembly.

13. The robotic gantry system of claim 1 wherein the anchor structure has a triangular configuration.

14. The robotic gantry system of claim 13 wherein the base of the triangular anchor structure is attached to the bridge, the triangular anchor structure is oriented in a substantially vertical plane, and the opposing corner of the triangular anchor structure is attached to the at least one cable.

15. A robotic gantry system comprising:
first and second columns each slidably riding a substantially horizontal rail;
a bridge slidably connected to the first and second columns so as to permit sliding of the bridge vertically with respect to the columns;
a cable support structure having an arm configuration extending upwardly from each end of the bridge;
an anchor structure affixed to and extending upwardly from approximately the center of the bridge;
at least one cable connected between each cable support structure at a location on each cable support that is above an end of the bridge and to the anchor structure at a location above the approximate center of the bridge; and
at least one other cable connected between each cable support structure at a location on each cable support that is above an end of the bridge and to the anchor structure at a location above the approximate center of the bridge, wherein the at least one cable and the at least one other cable crosses at a location between their ends; and
a nozzle assembly slidably connected to the bridge and configured to extrude cementitious material.

16. The robotic gantry system of claim 15 wherein the cables cross one another at a point approximately at the center of the bridge.

17. The robotic gantry system of claim 15 wherein each cable support structure includes a substantially-rectangular frame.

* * * * *